United States Patent
Imaseki et al.

(10) Patent No.: US 6,905,792 B2
(45) Date of Patent: Jun. 14, 2005

(54) COOLING SYSTEM AND COOLING PROCESS OF FUEL CELL

(75) Inventors: Mitsuharu Imaseki, Saitama (JP); Takeshi Ushio, Saitama (JP); Yoshirou Shimoyama, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 516 days.

(21) Appl. No.: 09/972,515

(22) Filed: Oct. 5, 2001

(65) Prior Publication Data

US 2002/0061426 A1 May 23, 2002

(30) Foreign Application Priority Data

Oct. 13, 2000 (JP) .......................................... 2000-313522
Jul. 17, 2001 (JP) .......................................... 2001-216177

(51) Int. Cl.[7] .......................... H01M 8/18; G05D 15/00
(52) U.S. Cl. ............................ 429/20; 429/22; 429/24; 429/25; 429/26; 429/13; 165/279; 165/280; 165/281; 165/282; 165/283; 165/284

(58) Field of Search ........................... 429/20, 22, 24, 429/25, 26, 13; 165/279, 280, 281, 282, 283, 284

(56) References Cited

U.S. PATENT DOCUMENTS 6,432,566 B1 * 8/2002 Condit et al. .................. 429/17
6,663,993 B2 * 12/2003 Imaseki et al. ................ 429/26
6,673,482 B2 * 1/2004 Imazeki et al. ................ 429/26

* cited by examiner

Primary Examiner—Bruce F. Bell
(74) Attorney, Agent, or Firm—Lahive & Cockfield, LLP; Anthony A. Laurentano, Esq.

(57) ABSTRACT

The present invention provides a cooling system of fuel cell, which solves the gas biting noise problem by trapping bubble in a coolant, gives protection to a stack (MEA) and the membrane of a humidifier by regulating the coolant pressure of fuel cell and improves the life of a ion exchanger by preventing foreign materials (carbonate ion etc.) from dissolving into the coolant.

21 Claims, 12 Drawing Sheets

FIG.12
(Prior Art)
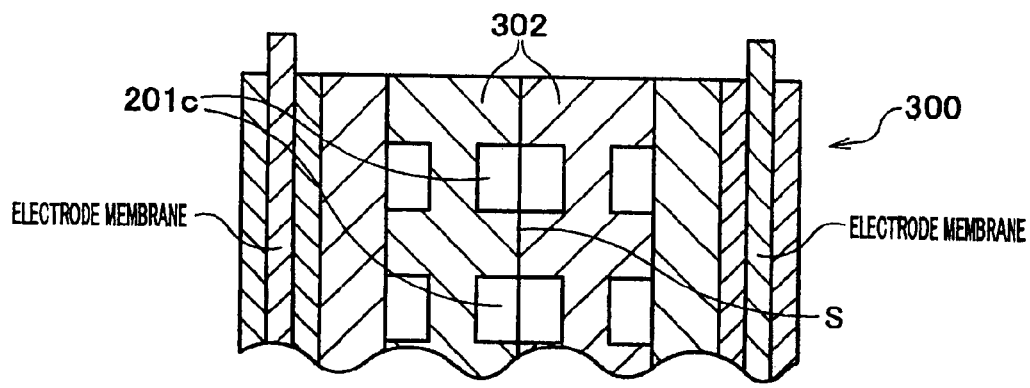
FIG.13
(Prior Art)
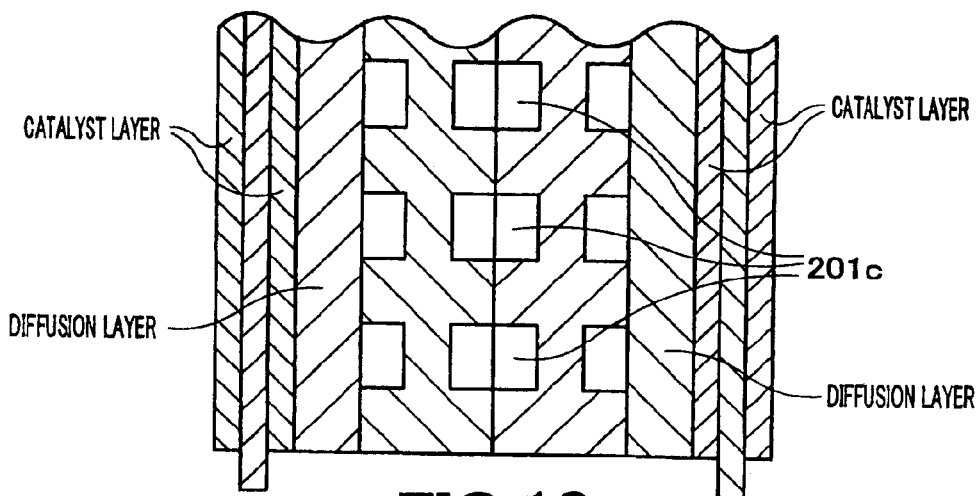
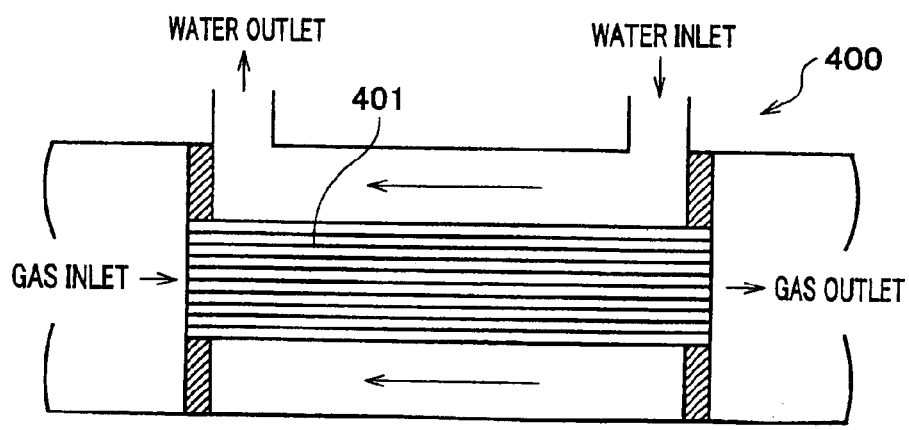

COOLING SYSTEM AND COOLING PROCESS OF FUEL CELL

FIELD OF THE INVENTION

The present invention relates to a cooling system of fuel cell, which employs a coolant, and a process for cooling the fuel cell.

BACKGROUND OF THE INVENTION

In recent years, extensive research and development works have been undertaken to provide a polymer electrode membrane type fuel cell. The polymer electrode membrane type fuel cell (PEFC) is capable of generating power under the room temperature conditions and has been coming into wide use. And this type of a fuel cell system does not require the compression of intake gas (air-fuel mixture), allowing the height of the whole system to be smaller than an internal combustion engine. Therefore, it can be disposed in a small space such as the under-floor of a vehicle compartment etc., and the space efficiency is improved.

This type of a fuel cell system comprises a cathode electrode and an anode electrode, which interpose a solid polymer membrane (electrode membrane). It drives an external load with the electrical power generated by the chemical reaction between the oxygen supplied to the cathode electrode and the hydrogen supplied to the anode electrode. However, because the chemical reaction for generating power is an exothermic reaction, a cooling system is essential to constantly perform a stable operation regardless of the output fuel cell.

As this type of a cooling system, a two-step heat radiation system is known, in which the heat generated during the power generation by the fuel cell is released by a radiator and the cooling line of the fuel cell is cooled through an intermediate heat exchanger. FIG. 10 shows said cooling system. As shown in FIG. 10, a cooling system 211 comprises; a cooling path 213 laid out in a fuel cell 212 to cool said fuel cell 212; a primary coolant circulating path 214 to circulate the primary coolant to the fuel cell 212; a secondary coolant circulating path 215 to cool the primary coolant circulating in said primary coolant circulating path 214; a heat exchanger 216 to cool the primary coolant by exchanging heat between the primary and secondary coolant. The inlet and outlet of said primary coolant circulating path 214 are respectively connected to the inlet and outlet of the cooling path 213 laid out in said fuel cell, and a radiator 217 is disposed within the secondary coolant circulating path 215. The secondary coolant cooled by said radiator 217 cools the primary coolant, thus cooling the fuel cell 212. A bypass path 218 bypassing the heat exchanger 216 is placed in the primary coolant-circulating path 214. A thermostat valve 220 is disposed at a connection 219 between said bypass path 218 and the downstream location of the primary coolant-circulating path 214 with regard to said heat exchanger 216. The switching of the thermostat valve 220 controls the primary coolant temperature to be appropriate for the power generation of the fuel cell 212. The primary and secondary coolants are a mixture of ethylene glycol and water, the ratio of the two fluids being determined as required.

It is necessary to humidify the electrode membrane to operate the fuel cell and there is a known device to collect the water for humidification (off-gas collection) from the generated water by the power generation of fuel cell. FIG. 11 depicts this type of a system. A cooling system 200 basically comprises; a coolant path 201c laid out in a fuel cell 201 to cool the same, a circulating path 202 and a circulating pump 202a connected to said coolant path 201c to circulate the coolant in the fuel cell 201, a heat exchanger 202b to cool the coolant, a thermo regulator 202c to control the temperature of the coolant supplied to the fuel cell 201. An outlet 202g and an inlet 202f of said circulating path 202 are connected to an inlet 201a and an outlet 201b of the coolant path 201c laid out in said fuel cell 201 and the fuel cell 201 is cooled by circulating the coolant with the circulating pump 202a.

Generally speaking in the cooling system of fuel cell, pure water or dielectric coolant is employed as coolant for the fuel cell cooling to prevent the phenomenon of fluid short circuit. (An off-gas is discharged from the fuel cell 201 as a mixture of vapor and water, which may cause a short circuit with the structure supporting the fuel cell 201 through said water. This short circuit is referred to as "fluid short circuit".)

In the circulating path 202, which is for the coolant of the cooling system of fuel cell 200, a bypassing path 202e is provided bypassing the heat exchanger 202b to directly supply the coolant to a thermoregulator 202c which is placed at a downstream in the bypassing path 202e when the coolant does not require cooling by the heat exchanger 202b. Thus, the cooling system 200 controls the coolant temperature appropriate for the power generation by the fuel cell 201.

Further, an ion exchanger 202d is provided in a bypassing path 202h, which connects the outlet-side path of the thermo regulator 202c and the upstream path of the circulating pump 202a, maintaining the low electrical conductivity of coolant.

In the cooling system 211 of fuel cell 212, circulating pumps 221 and 222 are provided for the primary coolant-circulating path 214 and the secondary coolant-circulating path 215 respectively to circulate the coolant. The circulating pumps 221 and 222 forcefully circulate the primary coolant and the secondary coolant respectively. However, when the vertical difference of the primary coolant-circulating path 214 is small and the gas venting of the path is not sufficient, the biting noise of the circulating pump 221 may occur.

It is feared that the intake pressure of the cooling path 213 varies and imposes the overload, which releases the contact of the separators, on the contact surface of cells of the fuel cell 212, namely the contact surface of the separators providing the cooling path 213, thus giving rise to the fluid leak and electrical conductivity failure of the coolant path 213, etc.

In said cooling system 200, when for instance the power output of the fuel cell 201 becomes large, the fluid pressure of the circulating path 202 will increase due to; (i) the coolant expansion by the temperature increase, (ii) the pressure loss inherent to the flow and (iii) the increase of operating pressure of the circulating pump 202a circulating the coolant. If the pressure of the coolant is too high, it may cause the following problems:

(1) As shown in FIG. 12, in a cell 300 of the fuel cell 201, the pressure of the coolant releases the contact surface S of separators 302, 302 providing the coolant path 201c, resulting in the cause of fluid leak or the electrical conductivity failure.

(2) When a humidifier 400 (humidifying by water chamber) with hollow fiber membranes 401, 401 shown in FIG. 13 is employed to humidify the gas supplied to the fuel cell 201, an excessive pressure will be imposed on the hollow fiber membrane 401 as the humidification is performed in a closed system.

As countermeasures, following are anticipated to solve the excessive-pressure problem; (a) part of the cooling system releasing to the atmosphere, (b) regulating the pressure of the cooling system to a predetermined pressure by connecting to the atmosphere to breath through a pressure regulating valve and (c) regulating the pressure of the coolant by balancing the cathode gas pressure and the coolant pressure with the connection of the cathode gas tube and the cooling system.

However, because the pressure regulation is performed by introducing the air and the cathode gas, which are directly exposed to the coolant, the carbon dioxide in the air or the cathode gas will dissolve into the coolant, ionizing the coolant to increase the electrical conductivity (deteriorating the electrical insulation). Though the carbonate ion is absorbed by the ion exchange resin and the increase in the electrical conductivity of the coolant (insulation deterioration) will be prevented when an ion exchanger 202d shown in FIG. 11 is prepared in the cooling system, there still remains a problem that the life of the ion exchanger 202d is reduced as the operating hour of the ion exchange resin is lessened.

Humidifiers 203a, 203b are used to humidify the gas supplied to the fuel cell 201, which humidify through a membrane. Because there is no pressure regulating means in the circulating path 202 of the coolant used for humidification, the pressure of the coolant will not be regulated even if the output of the fuel cell 201 increases and the fluid pressure of the circulating path 202 gets higher.

SUMMARY OF THE INVENTION

The first object of the invention is to remove the vapor in the coolant of the fuel cell.

Also the second object of the invention is to protect the stack (MEA) by regulating the pressure of the coolant of fuel cell.

Further the third object of the invention is to protect the membrane of the humidifier for humidifying the supplied gas of the fuel cell by regulating the pressure of the coolant of fuel cell.

Further, the fourth object of the invention is to extend the life of the ion exchanger by preventing foreign materials (carbonic acid ion etc.) from mixing into the coolant when the pressure of coolant is regulated.

According to one aspect of the invention, there is provided a cooling system of fuel cell, comprising a circulating path connected to the inlet and outlet of fuel cell coolant to cool the inside of fuel cell with layered structure, and a circulating pump to circulate a coolant in said circulating path, said system further comprising a vapor-fluid separator provided in a relatively high pressure point of said circulating path, a tank interconnected with said vapor-fluid separator through a gas venting path, said tank being interconnected with a relatively low pressure point of said circulating path through a coolant returning path, a pressure regulator placed in one of said gas venting path or said coolant-returning path, which is interconnected with the point that is more remote from the coolant inlet of said fuel cell.

Consequently, the bubble (gas) is trapped by the vapor-fluid separator and said bubble accumulated in the upper portion of the vapor-fluid separator is directed to the tank with the coolant as mixture of vapor and fluid. Collecting the bubble, the noise of circulating pump due to the bubble biting will disappear. In this case, all the bubble is not necessarily collected in the tank at one time. If the tank is interconnected with said circulating path through the coolant returning path and the cross section of said gas venting path is configured for gas venting, said bubble coming into the tank will be subsequently collected in the tank by repeating the circulating cycle, vapor-fluid separator→gas venting path→tank→coolant returning path→circulating path→cooing path→circulating path→vapor-fluid separator, though the bubble is not collected at one time. As a result, when all the bubble is collected with a plural number of circulating cycles, the noise of circulating pump due to the gas biting will disappear.

In this case a restriction would be preferably selected for said pressure regulator shown as the invention.

According to the invention, there is provided a cooling system of fuel cell, comprising a circulating path connected to the inlet and outlet of fuel cell coolant to cool the inside of fuel cell with layered structure, and a circulating pump to circulate a coolant in said circulating path, said system further comprising a vapor-fuel separator provided in a relatively high pressure point of said circulating path, a tank interconnected with the vapor-fluid separator through the gas-venting path, and a pressure-regulating valve mounted to said tank, which opens when the inner pressure of the tank exceeds a given pressure corresponding to the allowable inlet pressure of fuel cell coolant.

In this way, the connecting path gives a connection between the coolant circulating path to circulate the coolant and the tank and the relief valve opens when the tank inner pressure exceeds a given pressure, which corresponds to the allowable inlet pressure of coolant of said fuel cell inlet. Consequently, the inlet pressure of coolant of fuel cell inlet is maintained no greater than the allowable inlet pressure of fuel cell coolant. In this case, a diameter-extended portion may be provided in the connecting point between the interconnecting path and the primary coolant-circulating path to improve the gas trapping, which will terminate the gas biting noise of the circulating pump 11 in a short time.

According to the invention, there is provided a cooling system of fuel cell, in which said pressure regulating valve is configured so that it is interconnected with the atmosphere or the cathode gas supplying path, which supplies the oxidant gas to the fuel cell.

Because sufficient differential pressure is obtained this way, the gas trapping will be efficiently performed and the inlet pressure of coolant will be maintained no grater than the allowable inlet pressure of said fuel cell.

In this case, said pressure regulating valve would preferably comprise a relief valve shown as the invention.

According to the invention, there is provided a cooling system of fuel cell, composed so that the coolant pressure of fuel cell is regulated with the cathode pressure of the cathode gas-supplying path, which supplies the oxidant gas to the fuel cell.

Because the coolant pressure of the fuel cell is regulated with the cathode pressure, the fluid leak and the electrical conductivity failure caused by the abnormal increase in the coolant pressure will be prevented.

According to the invention, there is provided a cooling system of fuel cell, comprising a circulating path connected to the inlet and outlet of fuel cell coolant to cool the inside of fuel cell with layered structure, and a circulating pump to circulate a coolant in said circulating path, said cooling system further comprising a pressure regulator one room of which being connected to the atmospheric pressure and the other room being interconnected with said circulating path.

Because one room of the pressure regulator is interconnected with the atmospheric pressure and the other room is connected to the circulating path of the coolant, no direct contact between the coolant and the air will occur. So the soluble materials existing in the atmosphere will not be dissolved into the coolant. As a result, even if the ion exchanger is prepared in the cooling system to prevent the increase in the electrical conductivity of the coolant, the operating hour of ion exchange resin will not be reduced and the life of the ion exchanger of cooling system will be improved. Also, the pressure regulator functions so that the air is discharged when the coolant pressure is high and the air is taken in when it is low, thus regulating the coolant pressure. Therefore, the fluid leak and the electrical conductivity failure of the fuel cell caused by the coolant pressure in the circulating path when the fuel cell generates large output power can be solved.

According to the invention, there is provided a cooling system of fuel cell, in which said humidifier has the construction that said coolant flows in one side of the water vapor permeable membrane and said gas flows in the other side for humidification.

In the humidifier for humidification of the gas supplied to the fuel cell, the coolant flows in one side of the water vapor permeable membrane and said gas flows in the other side. Because said coolant pressure and said gas pressure are balanced by the pressure regulator, it is possible to prevent an excessive pressure from imposing on the humidifier membrane, which has been a problem when the fuel cell generates large power.

In this case, said pressure regulator would preferably include a pressure vessel and a flexible bellows that gives separate two rooms for said pressure vessel shown as the invention, or a pressure vessel and a membrane that gives separate two rooms for said pressure vessel shown as the invention. This type of construction will give a good balance between said coolant pressure and said gas pressure. Also said pressure regulator would include a cylindrical pressure vessel and a piston type structure that moves from one end to the other along the inner surface of said pressure vessel shown as the invention. If the pressure vessel is configured so that the volume varies interactively between one room and the other with the piston movement, it will be highly reliable with the high strength of the piston.

According to the invention, there is provided a cooling system of fuel cell, comprising a circulating path connected to the inlet and outlet of fuel cell coolant to cool the inside of fuel cell with layered structure, and a circulating pump to circulate a coolant in said circulating path, said cooling system further comprising a pressure regulator one room of which being interconnected with the cathode gas path of said fuel cell and the other room being connected to said circulating path.

Because one room of the pressure regulator is interconnected with the cathode gas path of said fuel cell and the other room to said circulating path, the coolant and the cathode gas will not directly contact. Therefore, the soluble materials existing in the cathode gas will not be dissolved into the coolant. As a result, even if an ion exchanger is prepared in the cooling system to prevent the increase in the electrical conductivity of the coolant, the operating hour of ion exchange resin will not be reduced and the life of the ion exchanger of cooling system will be improved. Also, the pressure regulator functions so that the pressure of cathode gas side is increased when the coolant pressure is high and the pressure of cathode gas side is decreased when the coolant pressure is low, thus regulating the balance between the cathode gas pressure and the coolant pressure. Therefore, the fluid leak and the electrical conductivity failure of the fuel cell caused by the coolant pressure in the circulating path when the fuel cell generates large output power can be solved.

In this case, said pressure regulator would preferably include a pressure vessel and a flexible bellows that gives separate two rooms for said pressure vessel shown as the invention, or a pressure vessel and a membrane that gives separate two rooms for said pressure vessel shown as the invention. This type of construction will give a good balance between said coolant pressure and said gas pressure. Also said pressure regulator would include a cylindrical pressure vessel and a piston that moves from one end to the other along the inner surface of said pressure vessel shown as the invention. If said pressure vessel is configured so that the volume varies interactively between one room and the other with the piston movement, it will be highly reliable with the high strength of the piston.

BRIEF DESCRIPTION OF THE DRAWINGS

Preferred embodiments of the present invention will be described below, by way of example only, with reference to the accompanying drawings, in which:

FIG. 12 is a cross sectional view illustrating the inner construction of the fuel cell of a fuel cell.

FIG. 13 is a cross sectional view illustrating a humidifier with hollow fiber membrane.

DESCRIPTION OF THE PREFERRED EMBODIMENTS

To describe the present invention more in detail, preferred embodiments of a cooling system of fuel cell according to the present invention will be described below in detail with reference to the accompanying figures.

(First Aspect)

The first aspect of the invention will be described in detail (First embodiment through third embodiment).

(First Embodiment)

Figure 1:
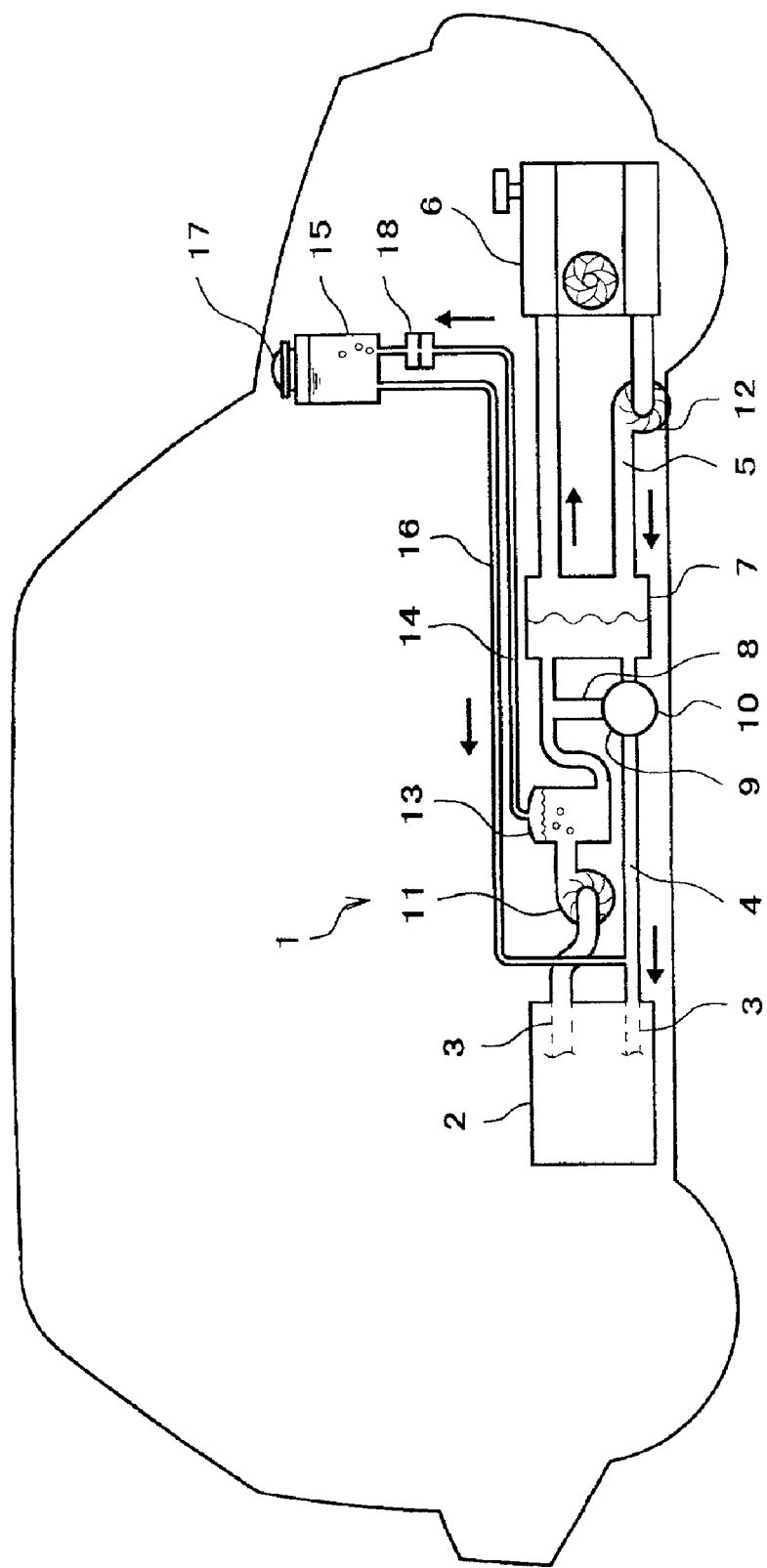
FIG. 1 is a schematic view illustrating a fuel cell system according to the first embodiment of the invention.

FIG. 1 shows the cooling system of fuel cell defined in a first embodiment of the invention. As shown FIG. 1 in cooling system of fuel cell, the inlet and outlet of a primary coolant circulating path 4 are respectively connected to the inlet and outlet of a cooling path 3, which is laid out in a fuel cell 2. Heat exchange is performed by a heat exchanger 7 between the secondary coolant cooled by a radiator 6 disposed in a secondary coolant circulating path 5 and a primary coolant. The inside of fuel cell 2 is cooled by the primary coolant thus cooled with heat exchange.

A bypass path 8 is prepared in said primary coolant circulating path 4 bypassing the primary side of heat exchanger 7. A thermostat valve 10 is disposed at a interconnecting point 9 between the downstream side of the primary coolant circulating path 4 with regard to the heat exchanger 7 and the bypass path 8. The temperature of primary coolant is controlled to the temperature appropriate for the power generation of fuel cell by switching the thermostat valve 10.

The primary coolant circulating path 4 and the secondary coolant circulating path 5 are provided with circulating pumps 11 and 12 respectively. The primary and secondary coolants are circulated by respective pumps 11 and 12. A vapor-fluid separator 13 serving as a gas reservoir is provided in the primary coolant-circulating path 4. A tank 15 is interconnected with the vapor-fluid separator 13 through a gas venting path 14. An orifice 18 is disposed in the gas venting path 14 as restriction in order to prevent the variation in the pressure and flow rate of the primary coolant-circulating path 4.

The vapor-fluid separator 13 is located in the point of the primary coolant-circulating path 4, where the pressure is relatively high. The vapor-fluid separator is not needed to locate in the geometrically highest point of the primary coolant circulating path 4 as it is requested only to trap and separate the gas flowing in the primary coolant circulating path 4.

In this embodiment of the invention, the vapor-fluid separator 13 is located in the direct downstream of the circulating pump to improve the performance of gas trapping. The primary coolant circulating path 4 is bent in the vertical direction so that the outlet of circulating pump 11 is located lower than the inlet of the same.

On the other hand as shown in FIG. 1, the point of the primary coolant-circulating path 4 where the fluid pressure is relatively high, or the inlet vicinity of primary coolant of the fuel cell 2 and the bottom of the tank 15 is interconnected by a coolant-returning path 16. In this embodiment of the invention, a pressure valve 17 as relief valve is mounted to the tank 15 to allow the use of tank as pressure monitoring vessel to maintain the tank pressure no greater than the allowable inlet pressure of the cooling path 3 (see FIG. 3).

In this case, the size of the tank 15 is determined to be large enough in preparation for an increase in the flow rate of the primary coolant-circulating path 4 and the flow rate of the cooling path 3, and an accidental pressure increase of inlet pressure of the cooling path 3. The valve opening pressure of the pressure valve is set so that it opens when the tank inner pressure exceeds a given pressure which corresponds to the allowable inlet pressure of the fuel cell coolant, purging the pressure of the tank 15 outside.

The operation of cooling system of fuel cell according to the first embodiment of the invention will be described below.

As shown in FIG. 1, when the circulating pumps 11 and 12 of the primary coolant circulating path 4 and the secondary coolant circulating path 5 are operated, the primary coolant circulates in the primary coolant circulating path 4 and the cooling path 3, and the secondary coolant circulates in the secondary coolant circulating paths and a water jacket (not shown) of the radiator 6, cooling the fuel cell 2 with the primary coolant cooled by heat exchange.

The gas circulating in the primary coolant circulating path 4 moves from the gas venting path 14 to the tank 15 in a mixture of gas and fluid as well as it is trapped by the vapor-fluid separator 13.

As mentioned before the gas venting path 14 is equipped with the orifice 18 to create the pressure loss, which neither induce backward flow nor affect the pressure of the primary coolant flowing in the primary coolant-circulating path 4. Therefore, the pressure of the primary coolant flowing in the primary coolant-circulating path 4 will be constantly maintained to the discharge pressure of the circulating pump 11.

If all the gas coming into the tank 15 is not collected by the tank 15 at one time, it will be collected with a couple of numbers of the circulating cycles of the primary coolant by the tank 15. Therefore, when all the gas is collected, the gas biting noise of the circulating pump will completely disappear.

On the other hand, the pressure valve 17 continuously monitors the inlet pressure of the cooling path 3 through the tank 15 and the coolant-returning path 16.

When the inner pressure of the tank 15 corresponds to the inlet pressure of the fuel cell 2, namely a given pressure, in which the inlet pressure of the cooling path 3 exceeds the allowable inlet pressure, the pressure valve opens and releases the tank inner pressure outside.

As a result, the inlet pressure of the cooling path 3 is constantly maintained no greater than the allowable inlet pressure of the cooling path 3. For example, given the allowable inlet pressure of the cooling path 3 of the fuel cell 2 is 100 kPa, the valve opening pressure of the pressure valve 17 is set for 100 kPa. In this case the pressure is selected from the range of 70 kPa through 100 kPa, and the fluid leak could be lessen if a lower pressure is selected.

Figure 3:
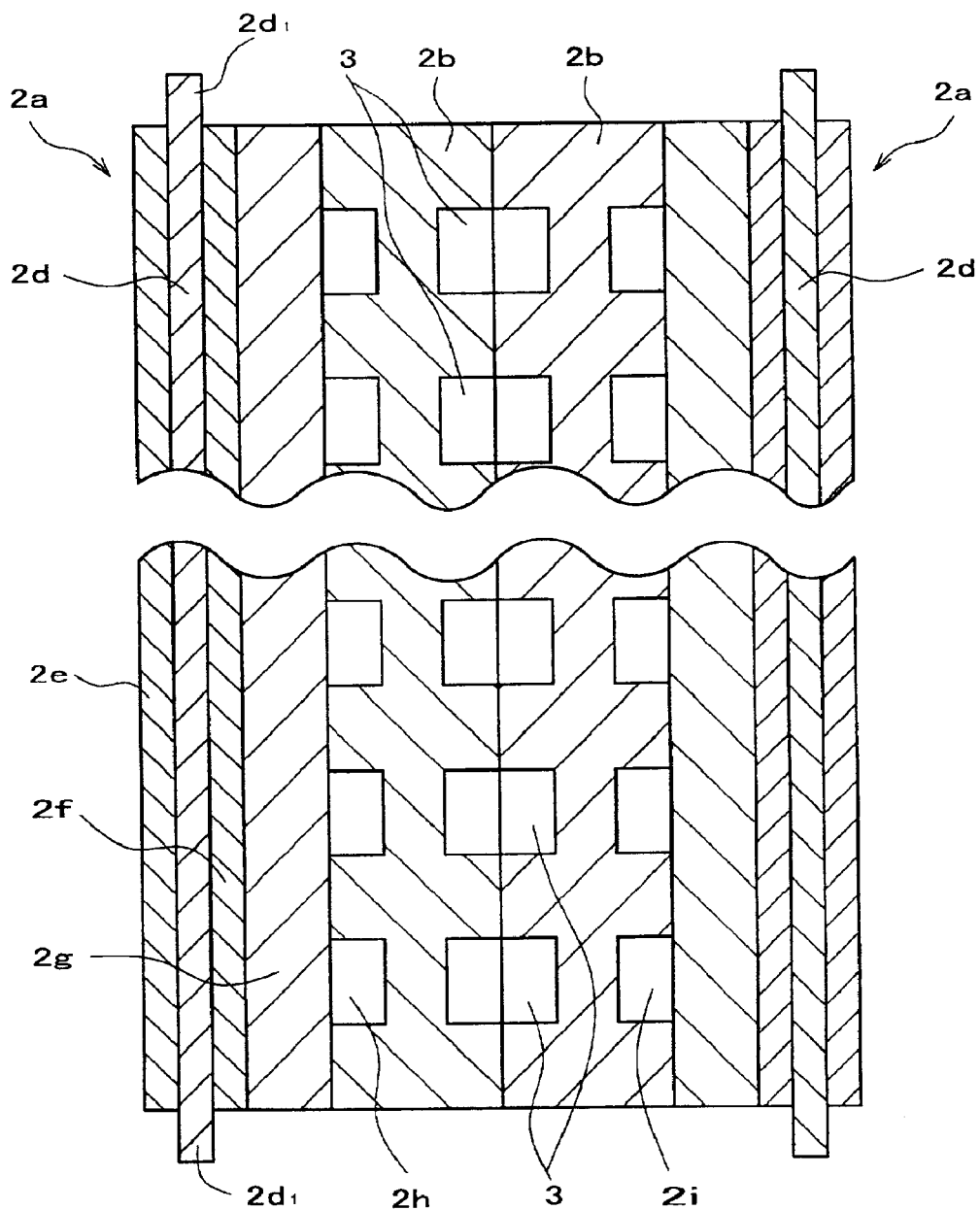
FIG. 3 is a cross sectional view illustrating the inner construction of the fuel cell of a fuel cell system according to the present invention.

Therefore, as shown in FIG. 3, the pressure of the cooling path 3 laid out on the contact surface of separators 2b, 2b of a cell 2a of the fuel cell 2 is constantly maintained no greater than the pressure set by the pressure valve 17, namely the allowable inlet pressure of the cooling path 3. As a result, the coolant leak caused by the contact release of the separators 2b, 2b and the damage to a narrow holding portion $2d_1$ caused by the stress concentration to the narrow holding portion $2d_1$ of the electrode membrane 2d against a stack case (not shown) are avoided. In FIG. 3 reference characters 2e and 2f refer to the catalyst layer, 2g gas diffusion layer, 2h the path directing the hydrogen as fuel and 2i the path directing the oxygen (oxidant gas) as fuel.

(Second Embodiment)

A second preferred embodiment of a cooling system of fuel cell according to the present invention will be described in detail with reference to FIG. 2. The same reference character is used for the same item as that of the first preferred embodiment, and the detail explanation would be omitted.

The differences associated with a second preferred embodiment of the invention are:

The vapor-fluid separator 13 is disposed before the inlet of the primary coolant of the fuel cell 2. The primary coolant-circulating path 4, from the outlet of the primary coolant of the fuel cell 2 to the circulating pump 11, and the bottom of the tank 15 is interconnected by the coolant-returning path 16, in which the orifice 18 is prepared.

In this second preferred embodiment, the pressure valve 17 regulates the gas venting and the pressure of the primary coolant at the inlet of the primary coolant of the fuel cell 2 as well as the first preferred embodiment of the invention shown in FIG. 1.

Therefore, the pressure of the cooling path 3 is constantly maintained no greater than the pressure set by the pressure valve 17, namely the allowable inlet pressure of the cooling path 3 as well as the first preferred embodiment of the invention. Thus the coolant leak caused by the contact release of the separators 2b, 2b and the damage to the narrow holding portion $2d_1$ due to the stress concentration of the narrow holding portion $2d_1$ of the electrolyte 2d against the stack case is avoided.

In this second preferred embodiment of the invention, a diameter-extended portion may be provided in the connecting point between the gas venting path 14 and the primary coolant circulating path 4 to improve the gas trapping, which will efficiently trap the gas to collect in the tank 15 and make disappear the gas biting noise of the circulating pump 11 in a short time.

(Third Embodiment)

Figure 4:
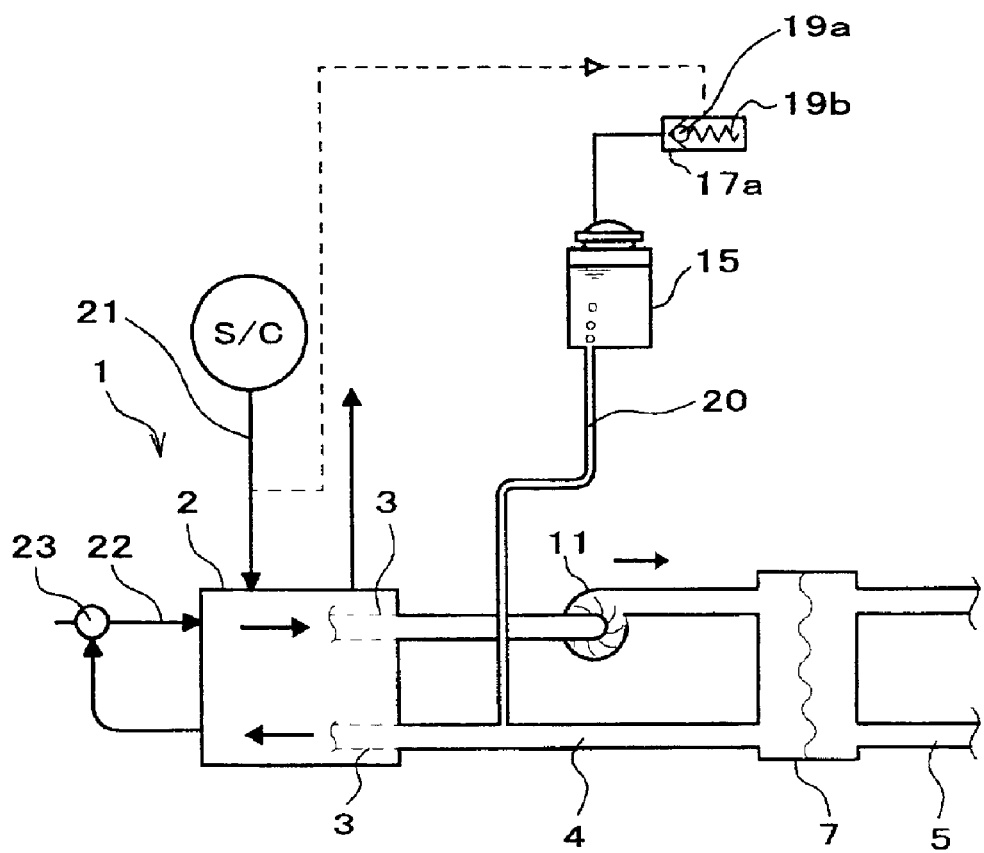
FIG. 4 is a cross sectional view illustrating a fuel cell system according to the third embodiment of the invention.

FIG. 4 shows the third preferred embodiment of a cooling system of fuel cell according to the present invention. The same reference character is used for the same item as that of the former preferred embodiments, and the detail explanation would be omitted.

As shown in FIG. 4, in the cooling system of fuel cell according to this embodiment, the vapor-liquid separator 13, the gas venting path 14 and the coolant-returning path 16 are deleted. The tank 15 is interconnected with the outlet side of the primary coolant-circulating path 4 with regard to the inlet of the cooling path 3 through the interconnecting path 20. A pressure valve 17a is mounted to the tank 15.

The diameter of the interconnecting path 20 is set the same as that of the gas venting path 14. The pressure valve 17a basically includes a check valve 19a and a return spring 19b regulating the valve opening pressure of the valve 19a.

The set force of the return spring 19b is adjusted so that the valve opens and maintains the inlet pressure of cooling path 3 no greater than the allowable inlet pressure when the inner pressure of the tank 15 exceeds the inlet pressure of the primary coolant of the fuel cell 2, namely the allowable inlet pressure of the cooling path 3, releasing the coolant of the tank 15 and the gas trapped in the tank 15 outside. It is possible to select an approach, which allows the adjustment of the total spring pressure with the addition of other assist force beside the return spring 19b.

For example, it is possible to introduce the air pressure of the air supply path 21, which supplies the air as fuel to the anode electrode of the battery 2, as assist force for the return spring 19b. The valve opening pressure, the summation of this air pressure and the spring force of the return spring 19b, is adjusted so that the valve opens when it exceeds the inlet pressure of the fuel cell 2, namely the allowable inlet pressure of the coolant path 3.

In this case, the purge gas and the primary coolant handled by the pressure valve 17a may be returned to the air supply path 21. Thus the spring fatigue is relaxed to prevent the chattering due to the spring fatigue, and the solid polymer electrode membrane of the fuel cell will be humidified by the purged coolant. In FIG. 4, S/C refers to a super charger to supply the fuel air compressed, numeral 22 a hydrogen supply path to supply the hydrogen as fuel to the anode electrode of the fuel cell 2, and numeral 23 a pump (vacuum pump) to supply the air as oxidant gas to the cathode electrode.

In this third preferred embodiment of the invention, a diameter-extended portion may be provided in the connecting point between the interconnecting path 20 and the primary coolant circulating path 4 to improve the gas trapping, which will efficiently trap the gas to collect in the tank and make disappear the gas biting noise of the circulating pump 11 in a short time.

So also in the third preferred embodiment of the invention, the pressure increase of the cooling path 3 laid out on the contact surface of separators 2b, 2b can be prevented. As a result, the coolant leak and the damage caused by the stress concentration to the narrow holding portion 21 of the electrode membrane 2d can be avoided.

The cooling system of fuel cell defined in the first or third embodiment provides the benefits:

The biting noise of the circulating pump 11 is prevented by purging the gas from the primary coolant-circulating path 4, which supplies the primary coolant to the fuel cell 2.

The fluid leak and the damage to the electrode membrane of fuel cell caused by abnormal increase in the inlet pressure of the primary coolant are prevented.

The gas is efficiently trapped by placing only the tank 15 relatively high location of the vehicle, which enables the mounting of the cooling system under the vehicle floor etc. to give a remarkable improvement for the space efficiency.

A small tube can be used for the gas venting path 14 and the coolant returning path 16 compared with the primary coolant circulating path 4, which will make the bending of tube easier and give better workability and layout flexibility.

Although in the first embodiment shown in FIG. 1 the orifice 18 is provided in the gas venting path 14, the orifice 18 may be deleted by using a smaller tube for the gas venting path 14 compared with the primary coolant circulating path 4, which circulates the primary coolant.

Figure 2:
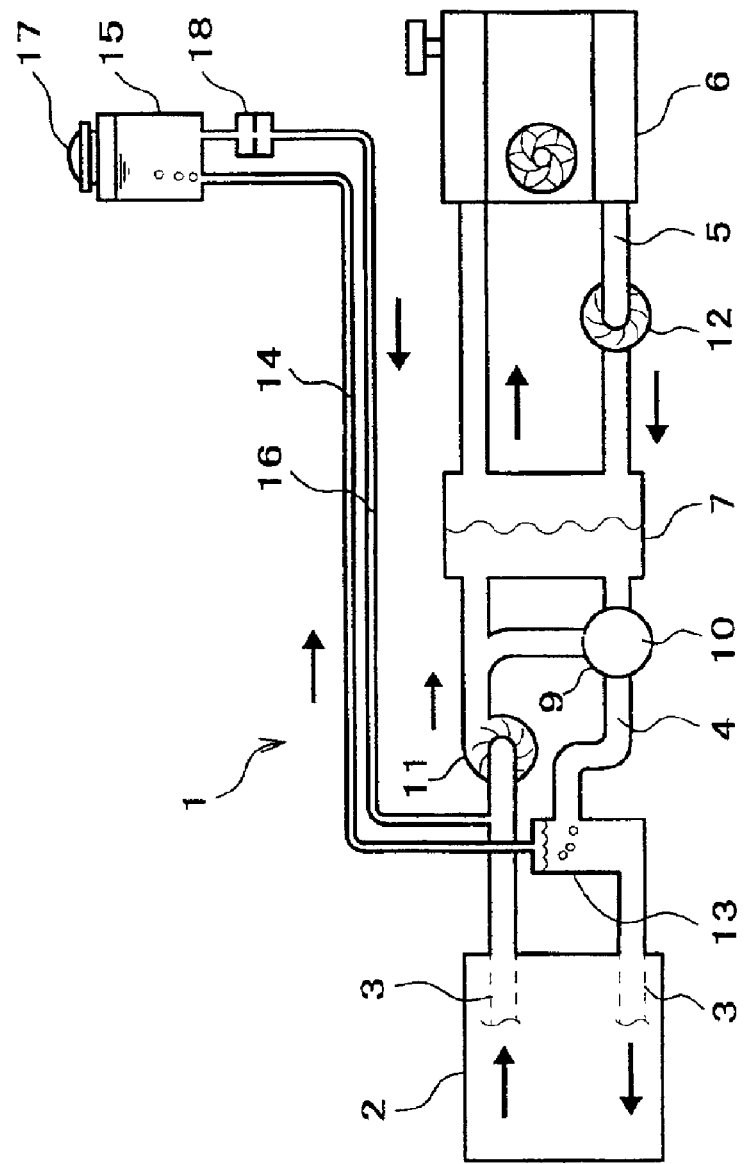
FIG. 2 is a schematic view illustrating a fuel cell system according to the second embodiment of the invention.

Although in the second embodiment shown in FIG. 2 the orifice 18 is provided in the coolant-returning path 16, the coolant-returning path may be configured smaller instead of employing the orifice 18.

Further, in the third embodiment shown in FIG. 4, the pressure valve 17 shown in FIG. 1 and FIG. 2 may be employed instead of the pressure valve 17a.

In each of the embodiments, it has been described that the fuel cell is cooled by the primary coolant, which is cooled by the heat exchanger 7. However, the coolant for the fuel cell 2 may be directly cooled by the radiator 6, or it may be cooled in a multi-step manner with the plural number of heat exchangers 6.

(Second Aspect)

Second aspect of the invention will be described in detail (Fourth embodiment through sixth embodiment).

(Fourth Embodiment)

Figure 5:
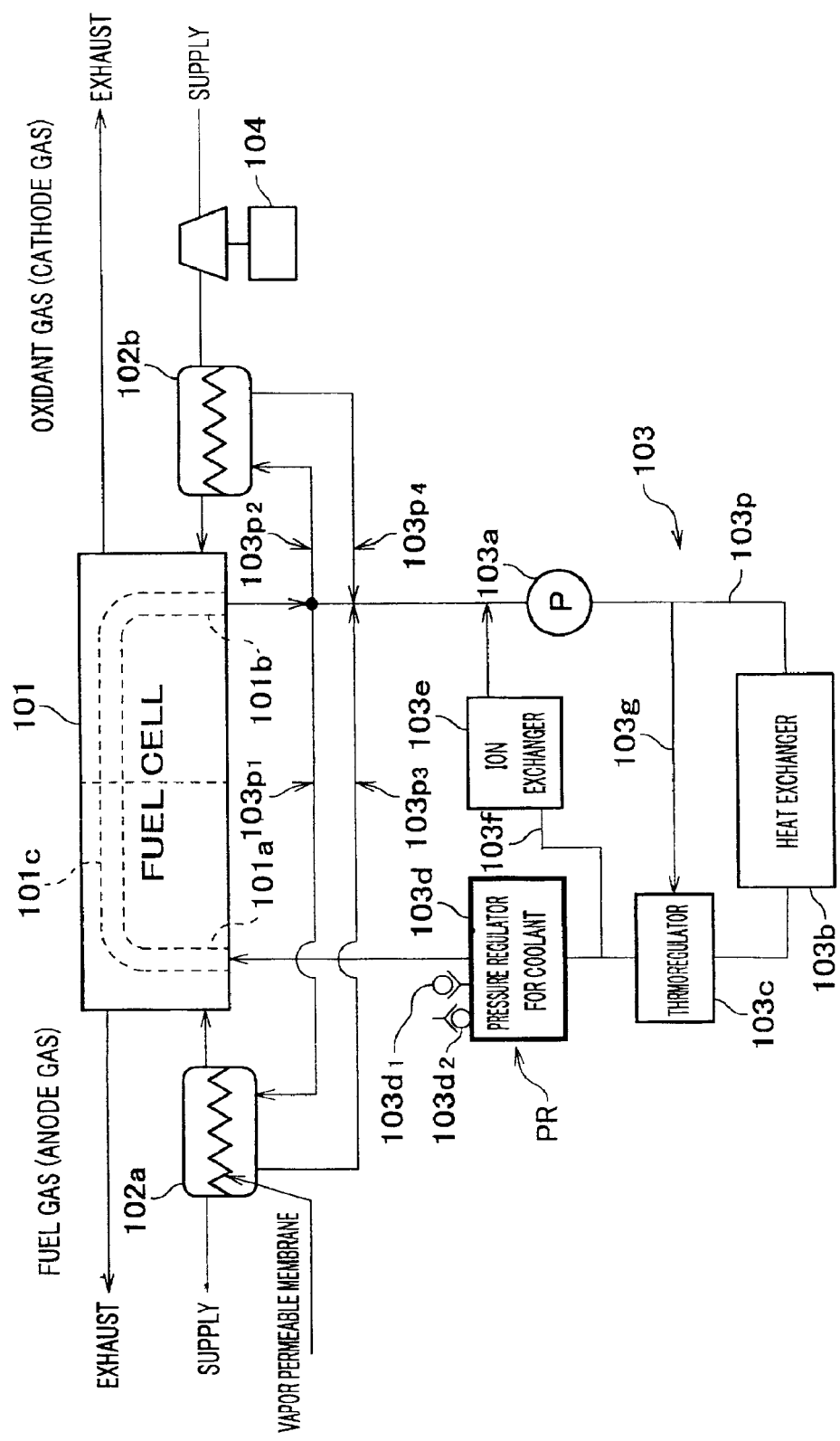
FIG. 5 is a schematic view of an overall structure of a cooling system of fuel cell according to the fourth embodiment of the invention.
Figure 6:
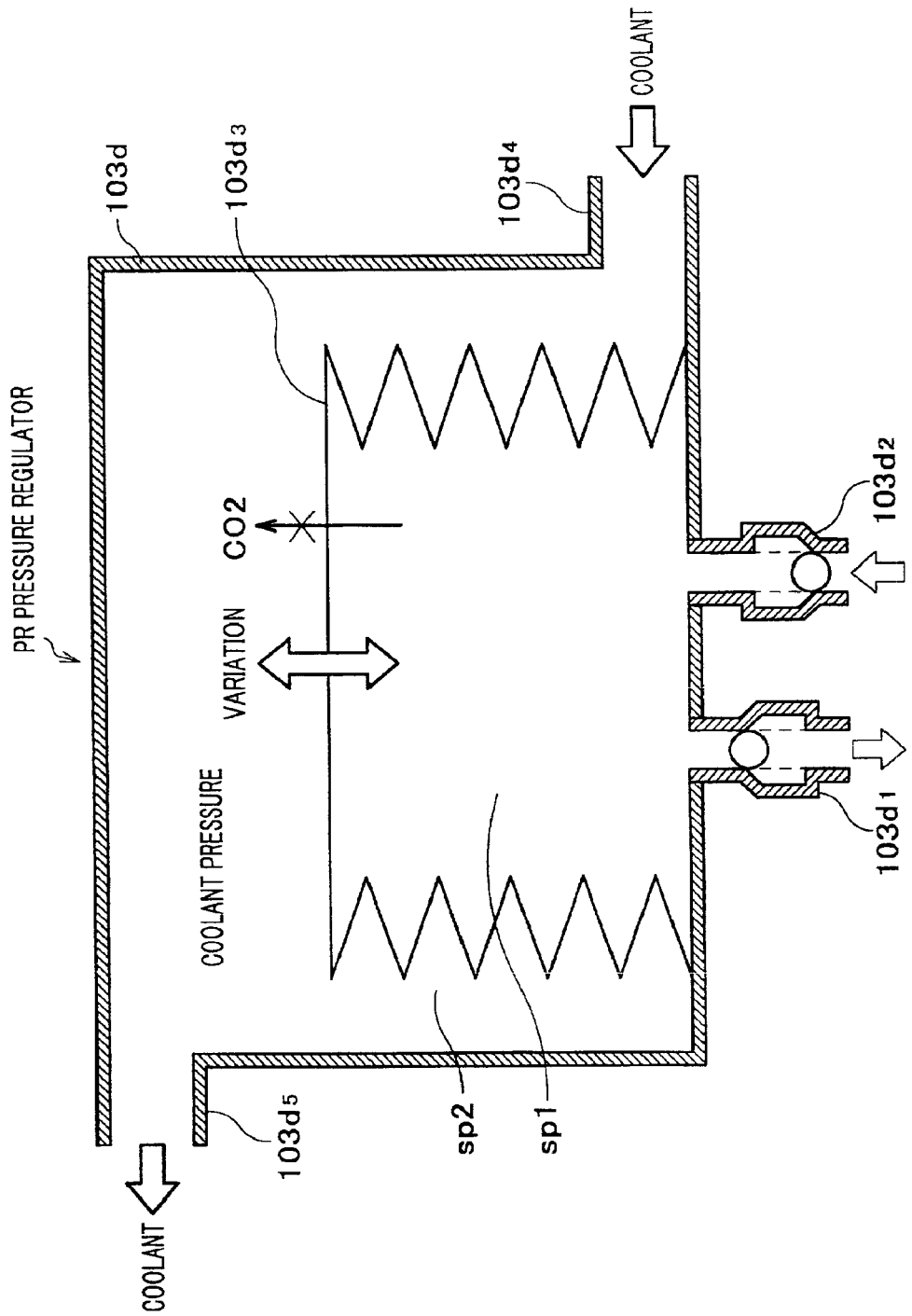
FIG. 6 is an illustrative view of pressure regulator structure used in a cooling system of fuel cell according to the fourth embodiment of the invention.

The cooling system of fuel cell defined in the fourth embodiment will be described in detail with reference to FIG. 5 and FIG. 6. FIG. 5 is a schematic view of an overall structure of a cooling system of fuel cell according to the fourth embodiment of the invention. FIG. 6 is an illustrative view of pressure regulator structure used in a cooling system of fuel cell according to the fourth embodiment of the invention.

As shown in FIG. 5, the cooling system of fuel cell defined in the fourth embodiment basically comprises; a fuel cell 101, two humidifiers 102a, 102b humidifying the fuel gas (anode gas) and the oxidant gas (cathode gas) supplied to the fuel cell 101, and a coolant circulating supply system 103 which circulates and supplies the coolant for the fuel cell 101 and the humidifiers 102a.

The coolant circulating supply system 103 basically comprises; a circulating pump 103a, a heat exchanger 103b for cooling the coolant, a thermo regulator 103c for controlling the coolant temperature, a pressure regulating vessel 103d which has a flexible bellows $103d_3$ (FIG. 6) inside and is the main portion of the pressure regulator PR, and a circulating path 103p where the devices/units are placed in a given order to supply the coolant to the fuel cell 101 an the humidifiers 102a, 102b.

In the cooling system of fuel cell configured as above mentioned, the coolant for the fuel cell 101 circulates in the circulating path 103p with the circulating pump 103a and is cooled with the heat exchanger 103b (heat exchanger such as radiator), controlled to an appropriate temperature for the fuel cell 101 operation and then introduced into the pressure regulator in the after step.

When the coolant does not require cooling with the heat exchanger 103b, it will be directly introduced into the thermo regulator 103c through a bypass path 103g, which bypasses the heat exchanger 103b.

As shown in FIG. 6, the pressure of the coolant directed by the pressure regulator PR is appropriately regulated with the pressure variation absorbing mechanism for the coolant, which consists of the bellows $103d_3$ inside the PR and pressure control valves $103d_1$, $103d_2$. The coolant is thus supplied to a coolant inlet 101a of the fuel cell 101. The details of structure and operation of the pressure regulator PR will be described later.

The pressure regulator should be placed interconnected with somewhere in the cooling system. It would be preferably placed near the tubes or devices, which are susceptible to the pressure influence, to avoid an excessive pressure to be imposed on them.

The coolant supplied to the coolant inlet 101a of the fuel cell 101 cools it while passing the coolant path 101c so that the fuel cell 101 can operate stably, and then is discharged from the coolant outlet of the fuel cell 101.

Either a part or all the coolant discharged from the coolant outlet 101b of the fuel cell 101 is supplied to the humidifier 102a of the fuel gas (anode gas) and the humidifier 102b of oxidant gas (cathode gas) through two branched paths $103p_1$, $103p_2$, which are branched from the circulating path 103p at the point that is located in the downstream of the fuel cell 101 and, at the same time, the upstream of the circulating pump 103a.

The coolant respectively supplied to the humidifiers 102a and 102b humidifies the fuel gas (anode gas) supplied to the fuel cell 101 by the high-pressure hydrogen source and the oxidant gas (cathode gas) supplied by a compressor 104 with the water vapor passing through the water vapor permeable membrane.

The coolant having humidified the fuel gas (anode gas) and the oxidant gas (cathode gas) is returned to the circulating path 103p from the humidifiers 102a and 102b through the paths $103p_3$ and $103p_4$, then circulated again by the circulating pump 103a.

Part of the coolant circulating the circulating path 103p is directed to an ion exchanger 103e, which prevents the increase in the electrical conductivity of the coolant (insulation deterioration).

The structure and operation of the pressure regulator PR used for the cooling system of fuel cell defined in the fourth embodiment of the invention will be described in detail with reference to FIG. 5 and FIG. 6.

As shown in FIG. 6, in the pressure-regulating vessel 103d forming the main body of the pressure regulator PR, there is the bellows which provides two rooms sp1 and sp2. The pressure control valves for expiring $103d_1$ and for inspiring $103d_2$ are connected to the room sp1, and the coolant inlet nozzle $103d_4$ and the coolant outlet nozzle $103d_5$ are connected to the other room sp2.

The room sp1 is connected to the atmosphere outside the pressure regulating vessel 103d through the pressure control valves $103d_1$ and $103d_2$. The other room sp2 is interconnected with the circulating path 103p (FIG. 5) for the coolant of the fuel cell 101 through the inlet and outlet nozzles $103d_4$ and $103d_5$.

Because the pressure regulating vessel 103d forming the main body of the pressure regulator PR is separated into the two rooms sp1 and sp2, in which the air and the coolant flowing in the circulating path 103p are directed into the respective rooms to regulate the coolant pressure, no direct contact between the coolant and the air will occur.

Because the carbon dioxide in the air does not dissolve into the coolant, the operating hour of ion exchange resin will not be reduced and the life of the ion exchanger 103e of cooling system will be improved.

The coolant inlet nozzle $103d_4$ is placed bottom on the side wall, on the other hand the coolant outlet nozzle top on the side wall.

Placing the inlet nozzle $103d_4$ and outlet nozzle $103d_5$ this way, the bubble is unlikely to accumulate in the coolant within the pressure regulator vessel 103d and the coolant pressure will be transferred accurately to the bellows $103d_3$. A membrane (refer the broken line in FIG. 9) or a piston type structure may be employed to separate the pressure-regulating vessel instead of the bellows $103d_3$.

A check valve will be used for the pressure control valves $103d_1$ and $103d_2$ connected to the other room sp1.

The pressure regulator PR configured this way and used in the cooling system of fuel cell defined in the fourth embodiment functions so that the room air (atmosphere) is expired outside from the room sp1 when the pressure of the coolant within the pressure regulating vessel 103d (=the pressure of the other room sp2) exceeds a given value for the pressure regulating valve $103d_1$, on the other hand the atmosphere is inspired into the room sp1 when the coolant pressure within the vessel falls below a given value for the pressure regulating valve $103d_2$. Therefore, the coolant pressure is regulated appropriately by the pressure variation absorbing mechanism consisting of the bellows $103d_3$ and the two pressure regulating valves $103d_1$ and $103d_2$.

As a result, the problems associated with the fluid leak and the electrical conductivity failure caused by the increase in the fluid pressure in the circulating path, which occur when the fuel cell generates large output power, are solved.

(Fifth Embodiment)

Figure 7:
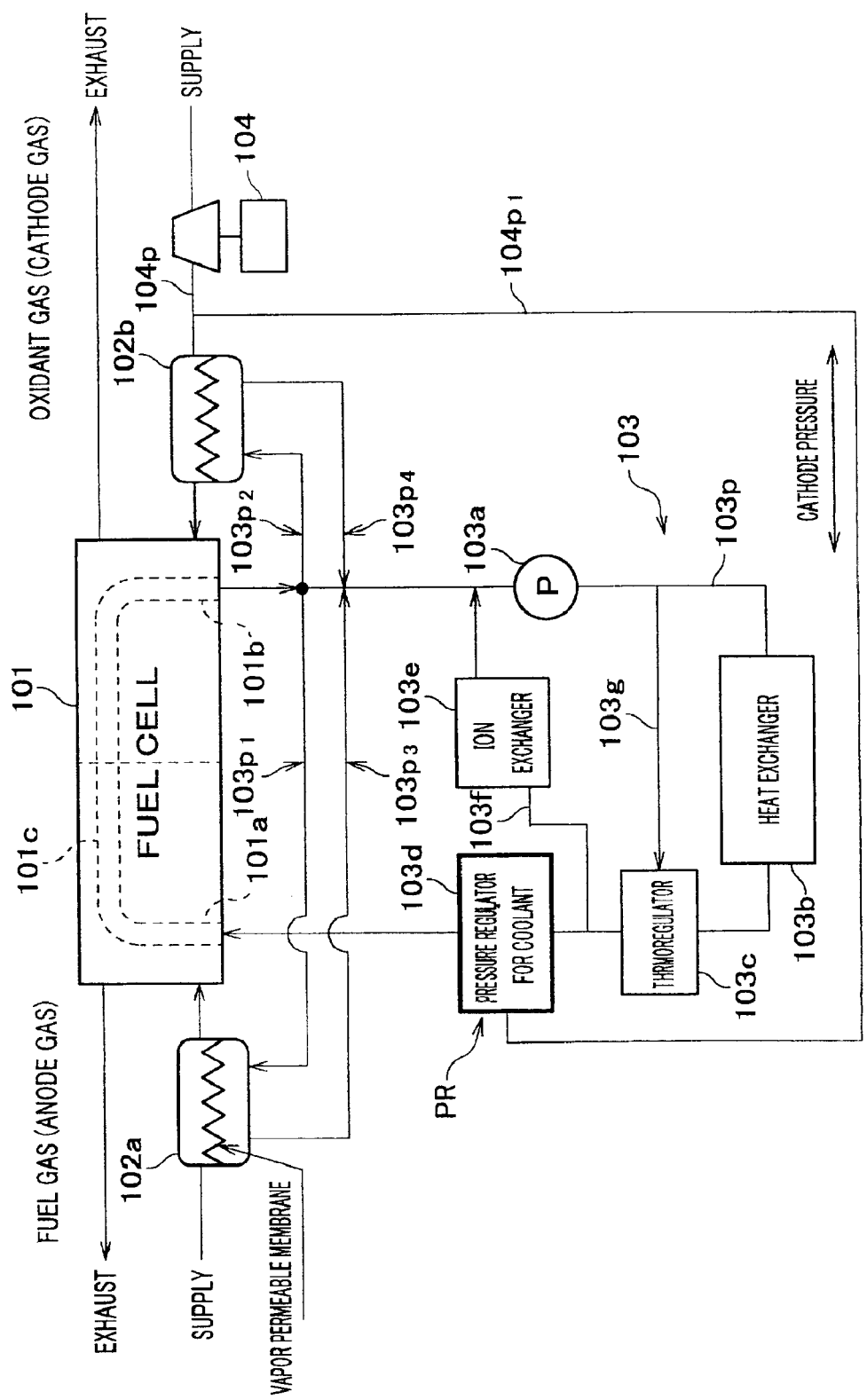
FIG. 7 is a schematic view of an overall structure of a cooling system of fuel cell according to the fifth embodiment of the invention.
Figure 8:
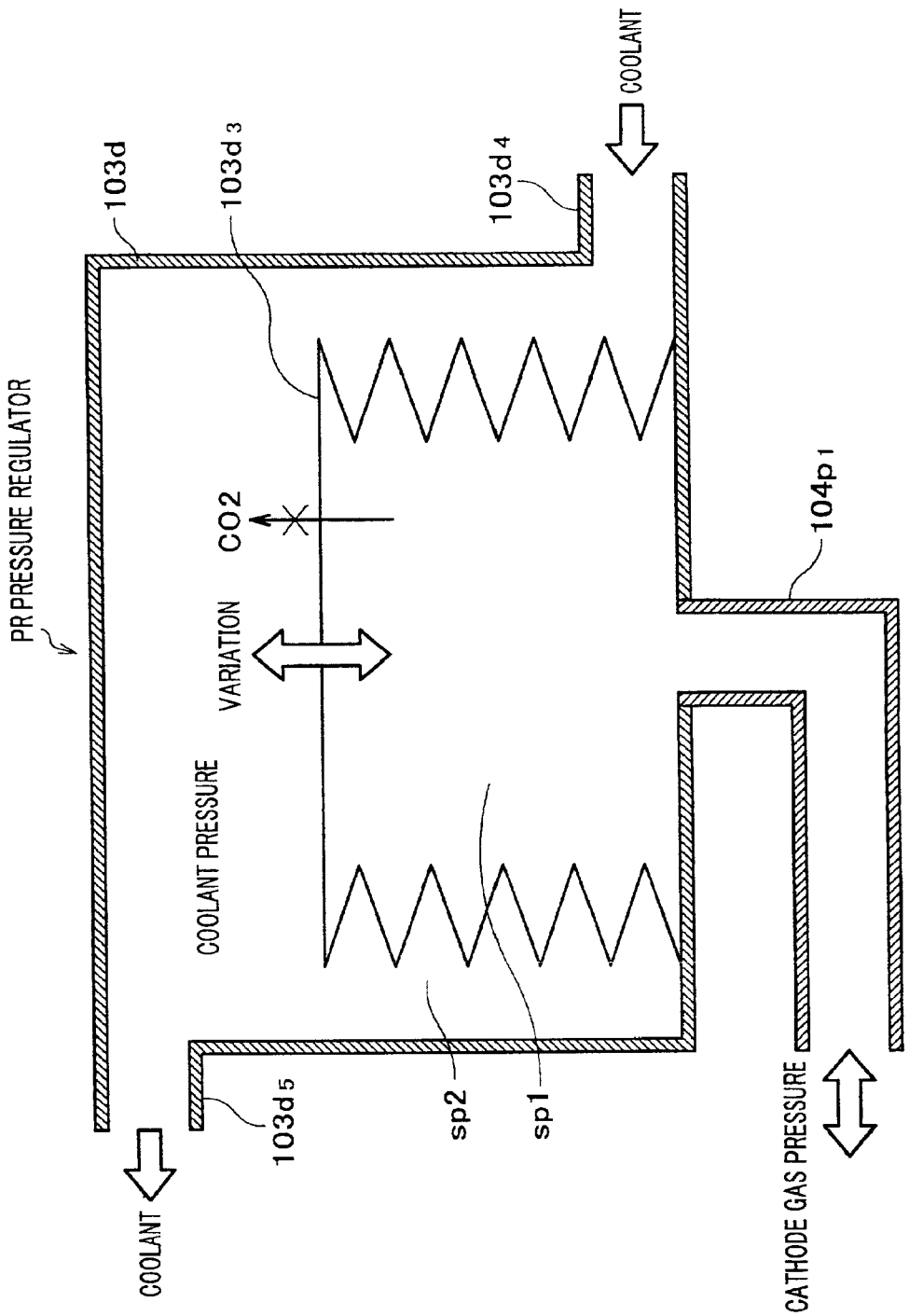
FIG. 8 is an illustrative view of pressure regulator structure used in a cooling system of fuel cell according to the fifth embodiment of the invention.

The cooling system of fuel cell defined in the fifth embodiment will be described in detail with reference to FIG. 7 and FIG. 8. FIG. 7 is a schematic view of an overall structure of a cooling system of fuel cell according to the fifth embodiment of the invention. FIG. 8 is an illustrative view of pressure regulator structure used in a cooling system of fuel cell according to the fifth embodiment of the invention.

The significant difference in the cooling system of fuel cell between the fourth embodiment and the fifth embodiment lies in the fact that the room sp1, one of the two rooms sp1 and sp2 of the pressure regulating vessel 103d of the pressure regulator PR separated by the bellows $103d_3$, is connected to the cathode gas path 104p through an interconnecting path $104p_1$, as shown in FIG. 7 and FIG. 8.

Here, the description will be limited to the structure and operation of the pressure regulator used in the cooling system of fuel cell defined in the fifth embodiment. The same numerals as those for the cooling system of fuel cell of the fourth embodiment are used for the same items.

The structure and operation of the pressure regulator used in the cooling system defined in the fifth embodiment will be described in detail with reference to FIG. 7 and FIG. 8.

As shown in FIG. 8, in the pressure regulating vessel 103d forming the main body of the pressure regulator PR, there is the bellows $103d_3$ changing in shape flexibly according to the pressure, which is placed at the bottom and provides two rooms sp1 and sp2. The interconnecting path $104p_1$ is connected to the room sp1, and the coolant inlet nozzle $103d_4$ and the coolant outlet nozzle $103d_5$ are connected to the other room sp2.

The room sp1 is connected to the cathode gas path 104p (FIG. 7) connecting the humidifier 102b and the compressor 104 of the fuel cell 101 through the interconnecting path $104p_1$. The other room sp2 is interconnected with the circulating path 103p (FIG. 7) for the coolant of the fuel cell 101 through the inlet and outlet nozzles $103d_4$ and $103d_5$.

Because the pressure regulating vessel 103d forming the main body of the pressure regulator PR is separated into the two rooms sp1 and sp2, in which the air (pressure is higher than the atmosphere), namely the cathode gas supplied by the compressor 104 and the coolant flowing in the circulating path 103p are directed into the respective rooms to regulate the coolant pressure, no direct contact between the coolant and the air will occur.

Because the carbon dioxide in the air does not dissolve into the coolant, the operating hour of ion exchange resin will not be reduced and the life of the ion exchanger 103e of cooling system will be improved.

The coolant inlet nozzle $103d_4$ is placed bottom on the side wall of the pressure regulating vessel 103d, on the other hand the coolant outlet nozzle $103d_5$ top on the side wall.

Placing the inlet nozzle $103d_4$ and outlet nozzle $103d_5$ this way, the bubble is unlikely to accumulate in the coolant within the pressure regulator vessel 103d and the coolant pressure will be transferred accurately to the bellows $103d_3$. A membrane (see the broken line in FIG. 9) or a piston type structure maybe employed to separate the pressure-regulating vessel 103d instead of the bellows $103d_3$.

The pressure regulator PR configured this way and used in the cooling system of fuel cell defined in the fifth embodiment functions so that the pressure of the cathode gas is increased by pressing the bellows $103d_3$ (decrease in volume) when the coolant pressure within the pressure regulating vessel 103d exceeds the pressure of cathode gas (air), on the other hand the pressure of the cathode gas is decreased by expanding the bellows $103d_3$ (increase in volume) when the coolant pressure falls below the cathode gas pressure. Therefore, the balance between the coolant pressure and the cathode gas pressure is constantly regulated.

As a result, the problems associated with the fluid leak and the electrical conductivity failure caused by the increase in the fluid pressure in the circulating path, which occur when the fuel cell generates large output power, are solved.

(Sixth Embodiment)

Figure 9:
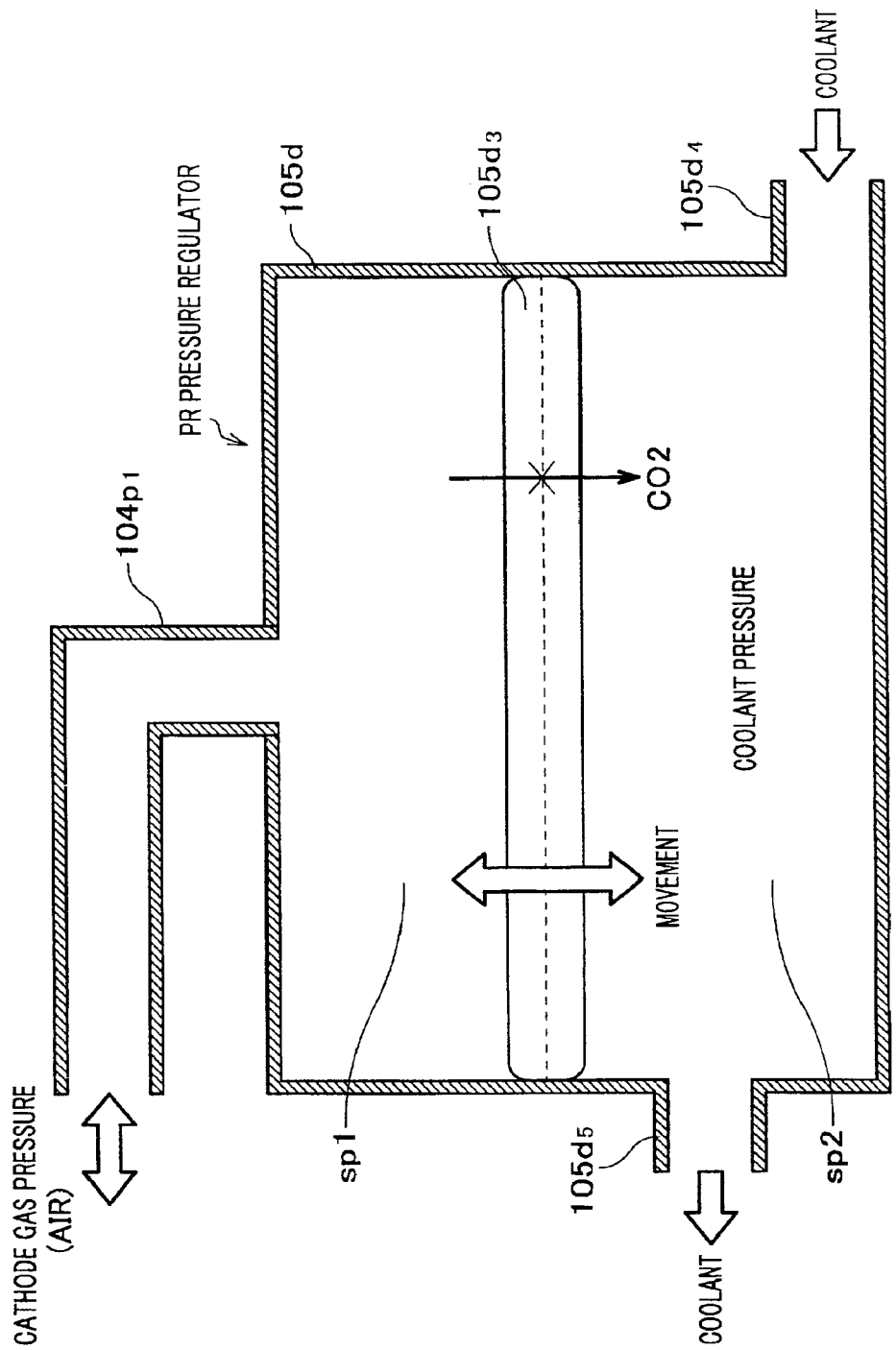
FIG. 9 is an illustrative view of pressure regulator structure used in a cooling system of fuel cell according to the sixth embodiment of the invention.
Figure 10:
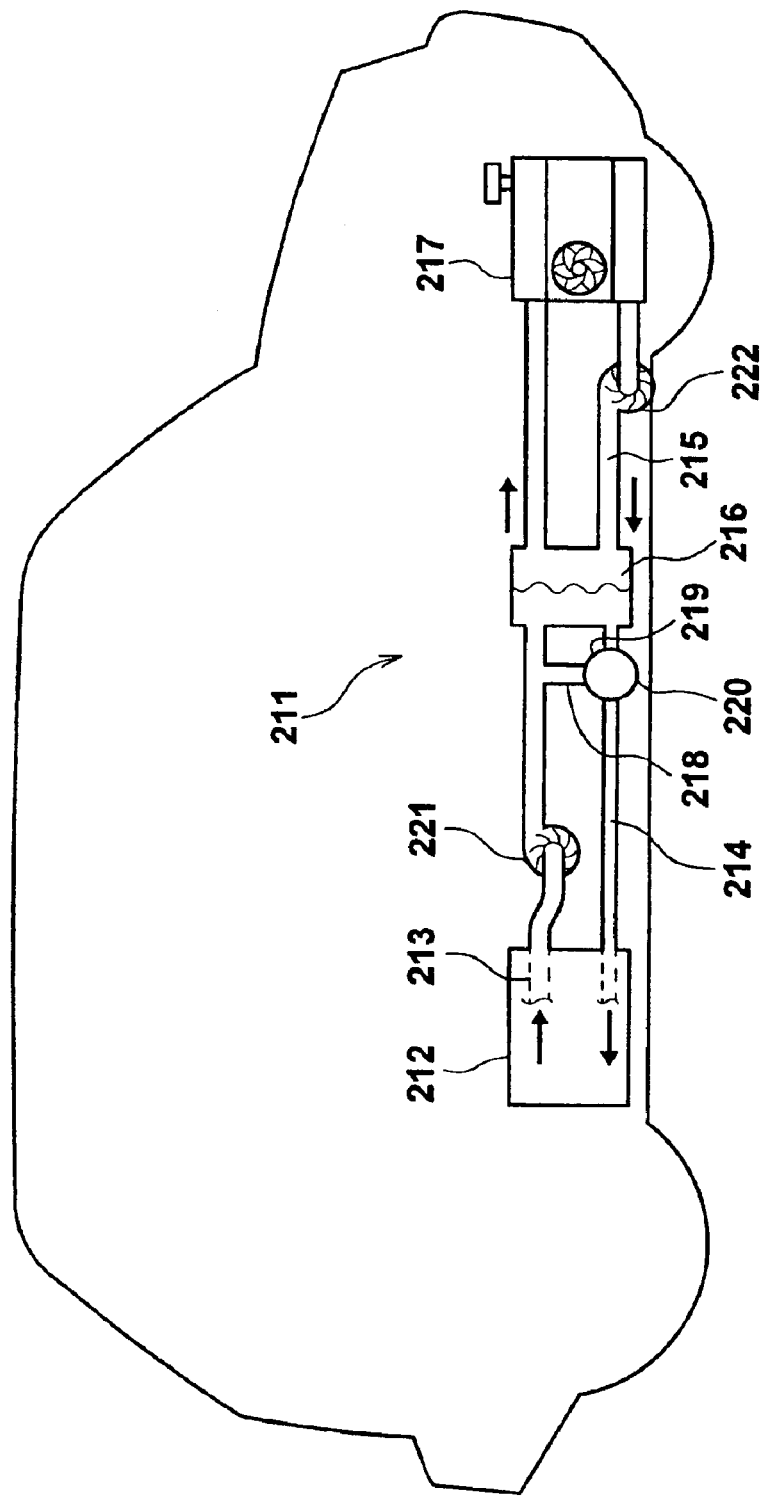
FIG. 10 is a schematic view illustrating a fuel cell system according to the prior art.
Figure 11:
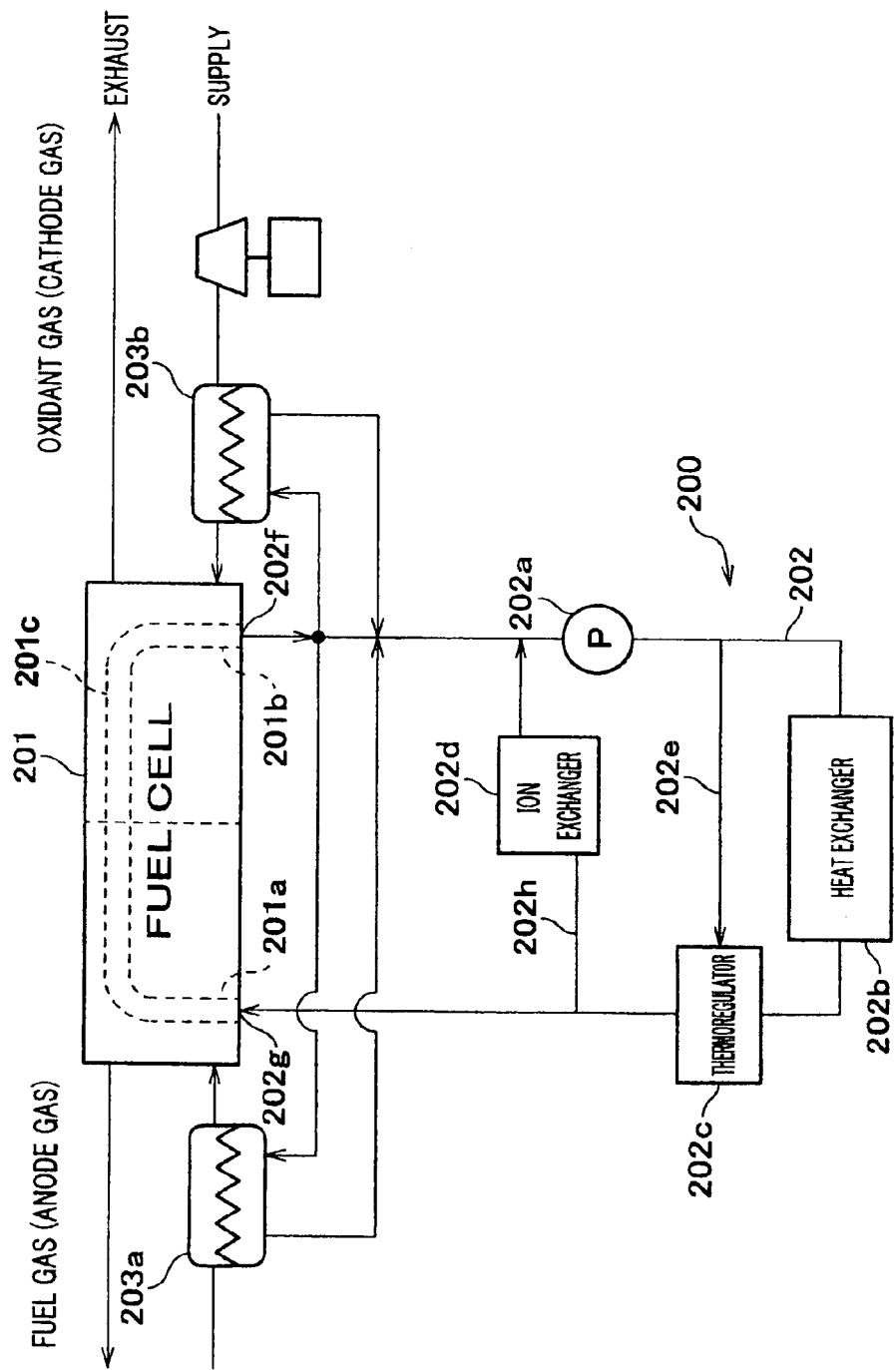
FIG. 11 is a schematic view of an overall structure of a cooling system of fuel cell according to the prior art.

The cooling system of fuel cell defined in the sixth embodiment will be described in detail with reference to FIG. 7 and FIG. 9. FIG. 9 is an illustrative view of pressure regulator structure used in a cooling system of fuel cell according to the sixth embodiment of the invention.

The significant difference in the cooling system of fuel cell between the fifth embodiment and the sixth embodiment lies in the fact that the room sp1, one of the two rooms sp1 and sp2 of a pressure regulating vessel 105d of the pressure regulator PR separated by a piston type structure $105d_3$, is connected to the cathode gas path 104p through the interconnecting path $104p_1$ as shown in FIG. 7 and FIG. 9.

Here, the description will be limited to the structure and operation of the pressure regulator used in the cooling system of fuel cell defined in the sixth embodiment. The same numerals as those for the cooling system of fuel cell of the fifth embodiment are used for the same items.

The structure and operation of the pressure regulator used in the cooling system defined in the sixth embodiment will be described in detail with reference to FIG. 7 and FIG. 9.

As shown in FIG. 9, in the pressure regulating vessel 105d forming the main body of the pressure regulator PR, there is the piston type structure $105d_3$ moving along the inner wall in the vertical direction, which provides two rooms sp1 and sp2. The interconnecting path $104p_1$ is connected to the room sp1, and a coolant inlet nozzle $105d_4$ and a coolant outlet nozzle $105d_5$ are connected to the other room sp2.

The room sp1 is connected to the cathode gas path 104p (FIG. 7), which connects the humidifier 102b and the compressor 104 of the fuel cell 101, through the interconnecting path $104p_1$. The other room sp2 is interconnected with the circulating path 103p (FIG. 7) for the coolant of the fuel cell 101 through the inlet and outlet nozzles $105d_4$ and $105d_5$.

Because the pressure regulating vessel 105d forming the main body of the pressure regulator PR is separated into the two rooms sp1 and sp2 by the piston type structure $105d_3$, in which the air (pressure is higher than the atmosphere), namely the cathode gas supplied by the compressor 104 and the coolant flowing in the circulating path 103p are directed into the respective rooms to regulate the coolant pressure, no direct contact between the coolant and the air will occur.

Because the carbon dioxide in the air does not dissolve into the coolant, the operating hour of ion exchange resin will not be reduced and the life of the ion exchanger 103e of cooling system will be improved.

The coolant inlet nozzle $105d_4$ is placed down on the side wall of the pressure regulating vessel 105, on the other hand the coolant outlet nozzle $105d_5$ is placed lower than the middle of the vessel and higher than the inlet nozzle $105d_4$ at the same time.

Placing the inlet nozzle $105d_4$ and outlet nozzle $105d_5$ this way, the bubble is unlikely to accumulate in the coolant within the pressure regulator vessel 105d and the coolant pressure will be transferred accurately to the piston type structure $105d_3$. A membrane (see the broken line in FIG. 9) or a bellows maybe employed to separate the pressure regulating vessel 105d instead of the piston type structure $105d_3$.

Though not in shown in a figure, the piston type structure $105d_3$ may be equipped with a spring so that it can be returned to the initial position when the operation of fuel cell 101 (FIG. 7) is terminated. Alternatively, appendices on the inner wall of the vessel for supporting the bottom of the piston type structure $105d_3$ at the both ends will work.

The pressure regulator PR configured this way and used in the cooling system of fuel cell defined in the sixth embodiment functions so that the pressure of the cathode gas is increased by moving the piston type structure $105d_3$ upward when the coolant pressure within the pressure regulating vessel 105d exceeds the pressure of cathode gas (air), on the other hand the pressure of the cathode gas is decreased by moving the piston type structure $105d_3$ downward when the coolant pressure falls below the cathode gas pressure. Therefore, the balance between the coolant pressure and the cathode gas pressure is constantly regulated.

As a result, the problems associated with the fluid leak and the electrical conductivity failure caused by the increase in the fluid pressure in the circulating path, which occur when the fuel cell generates large output power, are solved.

In the humidifiers 102a and 102b, which humidify the gas supplied to the fuel cell 101 in the cooling system of fuel cell defined in the fourth through sixth embodiments, the coolant is directed into one side of the water vapor permeable membrane and the gas is directed into the other side for humidification. The inside of the pressure regulating vessels 103d and 105d are separated into two rooms with the bellows 103d$_3$ or the piston type structure 105d$_3$ to form the pressure regulator PR, thus regulating the balance between the coolant pressure and the gas pressure. As a result, the problem associated with the excess pressure imposed on the humidifier membrane caused by the increase in the fluid pressure in the circulating path, which has occurred in the prior arts when the fuel cell generates large output power, is solved.

While the invention has been described in detail and with reference to specific embodiments thereof, it will be apparent to one skilled in the art that various changes and modifications can be made therein without departing from the spirit and scope thereof.

For example, the present invention is based on a technical idea that during the course of the fuel cell in a cooling system of the fuel cell comprising a circulating path and a circulating pump, the troubles described previously can be prevented if the temperature of coolant is regulated based on a prescribed pressure (e.g., spring set force, pressure of supply gas, atmospheric pressure, or such). Consequently, the process of cooling the fuel cell based on such a technical idea is also within the scope of the present invention.

Also, while regulation based upon the pressure of anode, which is gas supplied to the fuel cell has been mainly described, the regulation based on the pressure of cathode is also within the scope of the present invention.

What is claimed is:

1. A cooling system of a fuel cell, comprising:
    a circulating path connected to an inlet and an outlet of a coolant to cool an inside of the fuel cell, wherein the fuel cell has a layered structure,
    a circulating pump to circulate the coolant in said circulating path,
    a vapor-fluid separator provided in a relatively high pressure point of said circulating path,
    a tank interconnected with said vapor-fluid separator through a gas venting path, said tank being interconnected with a relatively low pressure point of said circulating path through a coolant returning path, and
    a pressure regulator placed in one of said gas venting path or said coolant-returning path, which is interconnected with the point that is more remote from the coolant inlet of said fuel cell.

2. The cooling system of fuel cell according to claim 1, in which a restriction is employed as said pressure regulator.

3. The cooling system of fuel cell according to claim 2, in which said pressure-regulating valve comprises a relief valve.

4. A cooling system of a fuel cell, comprising:
    a circulating path connected to an inlet and an outlet of a coolant to cool an inside of the fuel cell, wherein the fuel cell has a layered structure,
    a circulating pump to circulate the coolant in said circulating path,
    a vapor-fuel separator provided in a relatively high pressure point of said circulating path,
    a tank interconnected with the vapor-fluid separator through a gas-venting path, and
    a pressure-regulating valve mounted to said tank, which opens when an inner pressure of the tank exceeds a given pressure corresponding to an allowable inlet pressure of the coolant.

5. The cooling system of fuel cell according to claim 4, in which said pressure regulating valve is configured so that it is interconnected with the atmosphere or the cathode gas supplying path, which supplies the oxidant gas to the fuel cell.

6. A cooling system of a fuel cell, comprising:
    a circulating path connected to an inlet and an outlet of a coolant to cool an inside of the fuel cell, wherein the fuel cell has a layered structure,
    a circulating pump to circulate the coolant in said circulating path, and
    a pressure regulator having a first room connected to atmospheric pressure and a second room coupled to said circulating path.

7. The cooling system of fuel cell according to claim 6, in which said humidifier that humidifies the gas supplied to the fuel cell has the construction that said coolant flows in one side of the water vapor permeable membrane of said humidifier and said gas flows in the other side for humidification.

8. The cooling system of fuel cell according to claim 6, in which said pressure regulator includes a pressure vessel and a flexible bellows that forms the first and second rooms of said pressure vessel.

9. The cooling system of fuel cell according to claim 6, in which said pressure regulator includes a pressure vessel and a flexible membrane that forms the first and second rooms of said pressure vessel.

10. The cooling system of fuel cell according to claim 6, in which said pressure regulator includes a cylindrical pressure vessel and a piston type structure that moves from one end to the other along an inner surface of said pressure vessel so that a volume varies interactively between the first room and the second room with said piston type structure movement.

11. The cooling system of claim 6, wherein the pressure regulator comprises a pressure vessel and a movable element disposed within the pressure vessel for defining the first and second rooms.

12. A cooling system of a fuel cell, comprising:
    a circulating path connected to an inlet and an outlet of a coolant to cool an inside of the fuel cell, wherein the fuel cell has a layered structure,
    a circulating pump to circulate the coolant in said circulating path, and
    a pressure regulator having a first room coupled to a cathode gas path of said fuel cell and a second room connected to said circulating path.

13. The cooling system of fuel cell according to claim 12, in which said humidifier that humidifies the gas supplied to the fuel cell has the construction that said coolant flows in one side of the water vapor permeable membrane of said humidifier and said gas flows in the other side for humidification.

14. The cooling system of fuel cell according to claim 12, in which said pressure regulator includes a pressure vessel and a flexible bellows that forms the first and second rooms of said pressure vessel.

15. The cooling system of fuel cell according to claim 12, in which said pressure regulator includes a pressure vessel and a flexible membrane that forms the first and second rooms of said pressure vessel.

16. The cooling system of fuel cell according to claim 12, in which said pressure regulator includes a cylindrical pressure vessel and a piston type structure that moves from one end to the other along an inner surface of said pressure vessel so that a volume varies interactively between the first room and the second room with said piston type structure movement.

17. The cooling system of claim 12, wherein the pressure regulator comprises a pressure vessel and a movable element disposed within the pressure vessel for defining the first and second rooms.

18. A cooling system of a fuel cell, comprising:
   a circulating path connected to an inlet and an outlet of a coolant to cool the fuel cell, and
   a circulating pump to circulate the coolant in the circulating path,
   a tank coupled to the circulating path via an interconnecting path, and
   a pressure-regulating valve coupled to said tank, which opens when an inner pressure of the tank exceeds a pressure corresponding to an allowable inlet pressure of the coolant.

19. A process for cooling a fuel cell in a cooling system having a circulating path, a pressure regulator and a circulating pump, the process comprising the steps of:
   coupling the circulating path to an inlet and an outlet of a coolant to cool an inside of the fuel cell,
   circulating the coolant in the circulating path using the circulating pump, and
   regulating a pressure of the coolant flowing in said circulating path based on a prescribed pressure, wherein a first room of the pressure regulator is configured to receive the prescribed pressure and a second room of the pressure regulator is connected to the circulating path.

20. The process according to claim 19, which regulates the pressure of the coolant during or after gas venting.

21. The process according to claim 19, wherein the coolant pressure of fuel cell is regulated with the pressure of the gas to be supplied to the fuel cell.

* * * * *